Nov. 12, 1929.  J. I. HAASE  1,735,680
TIRE BUILDING MACHINE
Filed Sept. 9, 1925  2 Sheets-Sheet 1

INVENTOR
Jorgen I. Haase,
BY
ATTORNEY

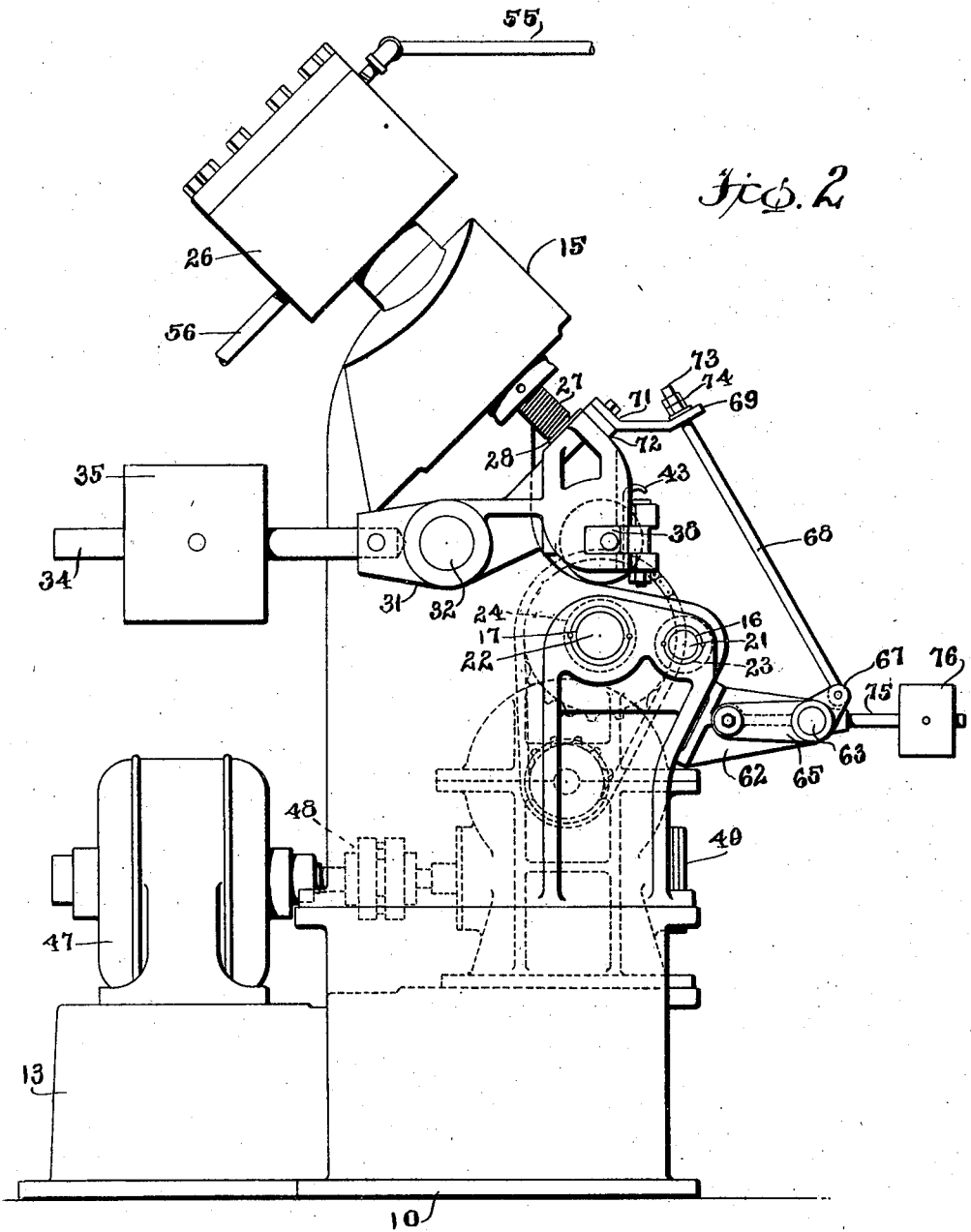

Patented Nov. 12, 1929

1,735,680

UNITED STATES PATENT OFFICE

JORGEN I. HAASE, OF AKRON, OHIO, ASSIGNOR TO THE GOODYEAR TIRE & RUBBER COMPANY, OF AKRON, OHIO, A CORPORATION OF OHIO

TIRE-BUILDING MACHINE

Application filed September 9, 1925. Serial No. 55,356.

My invention relates to tire building machines and it has particular reference to a machine adapted to secure a hard rubber band to the rim of a solid tire.

It is well-known that after vulcanization, soft rubber does not adhere readily to metal, but that hard rubber adheres to both metal and soft rubber. Hence, it is customary in the manufacture of solid and cushion tires, to apply a layer of hard rubber on the metal rim and to superimpose thereon the soft rubber section which is to form the tread of the tire. Upon vulcanization, the hard rubber forms an efficient seal between the rim and the tread of the tire. Heretofore, a hard rubber band has been applied to the metallic rim by hand. This invention contemplates the provision of a machine to perform the applying or stitching operation in an efficient manner.

In the drawings, which show one embodiment of the invention:

Fig. 2 is a side elevational view of the machine.

Figure 1:
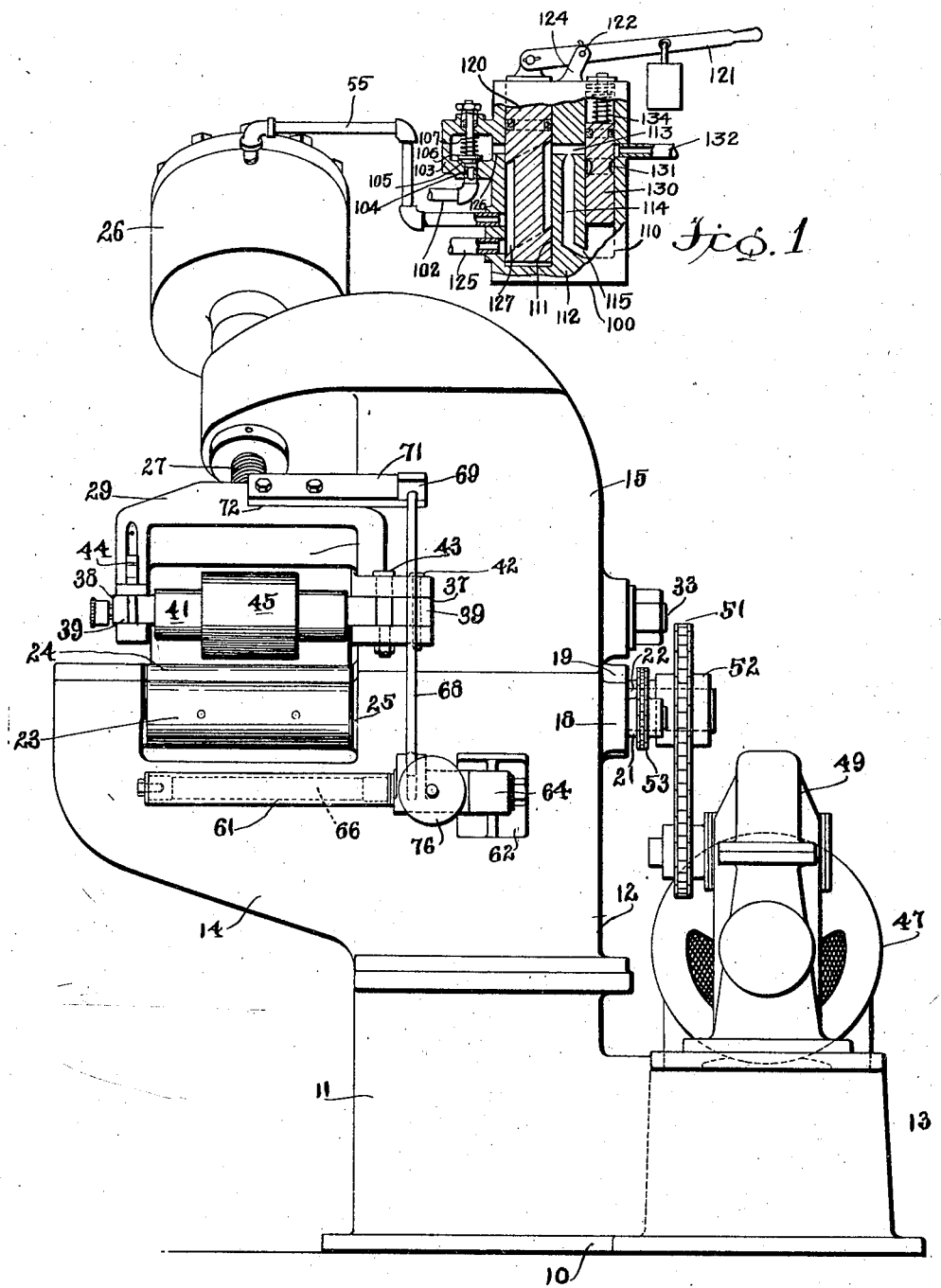
Fig. 1 is a front elevational view of the machine.

The machine comprises an L-shaped sub-base 10, having a portion 11 upon which is mounted a machine frame 12. The other portion 13 of the sub-base 10 has mounted thereon driving mechanism which will be hereinafter described.

The machine frame 12 has an outwardly projecting bracket 14 and an upwardly projecting portion 15, which are adapted to carry some of the movable elements of the machine. The outer end of the bracket 14 is formed into a boss having bearings 16 and 17. These bearings are in alignment with bearings 18 and 19 in the machine frame 12. Shafts 21 and 22 are journalled in the bearings 16 and 18, 17 and 19, respectively, and have rollers 23 and 24 keyed thereto. It will be noted that the center line of roller 24 is above that of roller 23.

A cylinder 26 is mounted on the upwardly projecting portion 15 of the frame 12. A piston rod 27 of the cylinder 26 extends through the upwardly projecting portion 15 and engages a removable plate 28 positioned against the back of a yoke 29. The yoke 29 constitutes one end of a lever 31 which is pivotally mounted upon a stub shaft 32 suitably secured to the frame 12. The other end of the lever terminates in a rod 34 which is secured to the lever and carries a counterweight 35. The moment of the counterweight is such that the yoke will bear at all times against the end of the piston rod 27.

The tines of the yoke 29 are provided with rectangular slots 37 and 38, which are adapted to receive the squared ends 39 of an arbor 41. The arbor 41 is pivoted in the slot 37 on a bolt 42, which passes between the extending portions of the yoke 29. The slots 38 and 37 are closed, to prevent accidental removal of the arbor 41, by a bolt 43 and a removable retaining pin 44. This arrangement provides a simple means for removing the arbor 41.

A removable roller 45, which may be replaced by a similar roller of different dimensions, fits loosely on the arbor 41. The dimensions of the roller 45 are determined by the width of the rim, the flanges of which should snugly receive the roller.

The rollers 23 and 24 are driven by a suitable source of power, such as a motor 47, which is mounted on the portion 13 of the sub-base 10. The motor is connected by a coupling 48 to a speed reducing unit 49. A suitable driving connection is established by means of a chain 51, extending from the unit 49 to a gear 52, which is keyed to the shaft 22. Sprockets are mounted on the projecting portions of shaft 21 and 22, as shown in Fig. 1. These sprockets are of the same size and are connected by a chain 53. When the motor is operated, rollers 23 and 24 will rotate in the same direction and at the same speed. It is desirable that the motor be so connected to the source of power that the drive may be reversed.

The cylinder 26 is connected by a pipe line 55 to a suitable source of fluid pressure and is provided with an exhaust conduit 56. It is the purpose of this cylinder to provide means to operate the piston rod 27 and thus force the yoke 29 downwardly toward the bracket 14. While various types of pressure means may be used, it has been found that hydraulic pressure is preferable. The pressure employed is rather high, since, in normal operation, from 1000 to 1500 pounds is found desirable.

The flow of fluid against the piston within the cylinder is controlled by a suitable valve 57 accessible to the operator of the machine. The valve selected is so constructed that a comparatively low initial pressure, less than three hundred pounds, is employed. This initial pressure is sufficient to force the yoke 29 downwardly, and to seat the roller 45 between the upstanding flanges of the rim. After the roller 45 is seated against the rim, the pressure automatically increases to a maximum. The construction of a valve which will control the pressure in this manner while well known to those skilled in the art, is clearly illustrated in Fig. 1 of the drawing.

This valve comprises a casing 100, one side of which is provided with an auxiliary hollow casing 103. A low pressure conduit 102 communicates with the interior of the auxiliary casing 103 through an opening 104 which is countersunk at its inner end as indicated at 105. Normally the opening 104 is closed by a conically faced valve 106 resiliently retained by a spring 107 against the countersunk portion of the opening. The casing 100 is provided with vertically extending cylindrical openings 110 and 111 which are separated by a wall 112. A passageway 113, extending through the wall 112, is adapted to connect the openings 110 and 111 at certain stages in the operation of the valve. This passageway also communicates with a vertically disposed passageway 114 which, at its lower end, communicates with the cylindrical opening 110, as indicated at 115.

The conduit 55 connected to the cylinder 26, extends into the casing 100 and communicates with the opening 111 therein. Also a discharge conduit 125 communicates with the last mentioned opening in the casing. An opening 126, extending through the wall of the casing, connects the opening 111 to the interior of the auxiliary casing 103. A plunger 120, slidably disposed in the opening 111, projects above the casing 100 and is operable by a handle 121 pivoted, as indicated at 122, to a bracket 124 integral with the casing. Intermediate its length, the plunger 120 is of reduced diameter to provide a passageway 127 between the plunger and the sides of the opening 111.

A second plunger 130 is disposed in the opening 110 in the casing 100 and is normally pressed downwardly by a spring 134 encircling a reduced portion of the plunger and disposed in the upper end of the opening. Intermediate its length, the plunger 130 is provided with a groove 131, thereby providing a circular space between the walls of the opening 110 and the plunger. The opening 110 also communicates with a conduit 132 which is adapted to supply fluid under high pressure to the opening 110.

When the parts of the valve are in their inoperative positions, the conical valve 106 is so positioned that the opening 104 in the auxiliary casing 103 is closed and the plunger 120 is so disposed in the opening 111 that the opening 126 is closed to the opening 111 while the conduit 125 is in communication with such opening. At all times, the conduit 55 is in communication with the opening 111. In turn, the plunger 130 is so disposed in the opening 110 that the circular space 131 is beneath the openings 113 and the point at which the conduit 132 extends into the casing 100. Movement of the lever 121 downwardly so moves the plunger 120 that the opening 126 connects the interior of the auxiliary casing 103 with the opening 127 provided between the plunger and the casing 100. Fluid under pressure in the conduit 102 now forces the conical valve 106 upwardly and permits the fluid to flow into the opening 127 and through the conduit 55 into the upper end of the cylinder 26 thereby moving the piston in the cylinder downwardly. Such movement of the plunger upwardly also closes the discharge conduit 125 to communication with the opening 111.

Fluid flowing through the opening 127 also flows through the openings 113, 114 and 115 into the space in the opening 110 below the plunger 130. After the piston has reached its lowermost position in the cylinder 26, the pressure of fluid in the valve automatically builds up to the pressure in the conduit 102. This pressure is sufficient to move the plunger 130 upwardly against the action of the spring 134, thereby exposing the space 131 to the openings 113 and the conduit 132. This permits fluid under high pressure in the conduit 132 to enter the space 131 and exert a high pressure upon the fluid already in the valve and cylinder and against the piston in the latter. The increased pressure of the fluid also automatically closes the conical valve 105 by reason of its action upon the upper face of the valve. When the operation of the roller 45 is completed, the handle 121 is moved upwardly about the pivot 122 and the plunger 120 is returned to its inoperative position. This closes the opening 126 to communication with the opening 127 and opens the latter to the discharge conduit 125. This permits the fluid in the valve to flow through the discharge conduit, which flow of fluid so reduces the pressure beneath the plunger 130 that the spring 134 moves the latter downwardly thereby disconnecting the conduit 132 from communication with the space 131 and the opening 113. As soon as the plunger 120 is again moved upwardly, the fluid under high pressure retained in the casing 103 flows into the space 127, thereby permitting fluid under low pressure in the conduit 102 again to open the valve 106.

It is found that the operation is more satisfactory if an auxiliary roller 61 be employed. The auxiliary mechanism includes a bracket 62, mounted on the face of the frame 12, which supports a stub shaft 63, mounted in the outer end thereof, as indicated at 64. One arm of a bell crank lever 65 supports an axle 66 upon which the roller 61 is rotatably mounted. The other arm of the bell crank lever 65 is clevised, as indicated at 67, to receive a rod 68, which is secured therein and extends upwardly through a projection 69 on a bracket 71, secured to the face of the yoke, as indicated at 72. The aperture in the projection 69 is of greater diameter than the diameter of rod 68 in order that the rod may slide freely therethrough. The upper end of the rod 68 is threaded, as indicated at 73, to receive lock nuts 74, which prevent the rod from slipping through the aperture and provide means to adjust the distance between the projection 69 and the clevis 67. A rod 75, secured to the bell crank lever 65, has a counter-weight 76 mounted thereon.

As the yoke 29 moves downwardly toward the bracket 14, the rod 68 is forced outwardly, thus permitting the roller 61 to move upwardly and outwardly under the influence of the force exerted by the counter-weight 76. The length of the rod 68 is so adjusted that the roller 61 will contact with the rim upon which the base band is to be stitched and prevent the rim from swinging against the bracket 14. Danger to the operator from having his hands caught between the roller 23 and the rim therefore is greatly diminished. It is to be understood that this auxiliary roller may be employed with all sizes of rims and it is advantageous to do so as a matter of safety. The auxiliary roller is particularly useful when employed with large and heavy rims.

When the pressure is removed from the cylinder 26, the counter-weight 35 moves downwardly, thus forcing the yoke 29 upwardly. The parts of the machine are then in the position shown in the drawings. It will be noted that there is sufficient space between the roller 45 and the rollers 23 and 24 to permit the insertion of a rim over the bracket 14 and between the rollers 45, 23 and 24. When a rim has been placed over the rollers 23 and 24, hydraulic pressure is applied and the yoke 29, carrying the member 45, moves downwardly, and holds the rim firmly against the roller 24. At the same time, the auxiliary roller 61 moves upwardly, and contacts with the inner periphery of the rim.

A uniform distance is maintained between the roller 45 and the rim, by providing the removable plate 28 between the piston rod 27 and the yoke 29. The plate 28 is chosen with such thickness that the yoke 29 carrying the roller 45, is always pushed downwardly within a constant distance of the periphery of the rim, positioned over the roller 24. Hence the band of hard rubber, applied to the rim, is compressed to the same extent, and under the same pressure, regardless of its original thickness.

A strip of cold hard rubber, of substantially the same width as the distance between the flanges of the rim, is then brought by suitable means, such as a conveyor, to the line of contact of the member 45 with the rim. The motor is started, and as the rollers 23 and 24 revolve, the rim with the hard rubber base band is carried between rollers 24 and 45. As the rim and base band are fed into the machine, the pressure exerted through the member 45 forces the hard rubber against the rim and causes the band to adhere firmly. When a complete revolution has been made, and rubber has been stitched to the entire rim, the motor is stopped, and the strip of hard rubber is severed at the joint. If desired, the machine may be started again and the rim given another revolution, to insure the rubber adhering at all points. After the motor is stopped, the fluid pressure is released, permitting the yoke 29 to move upwardly under the force exerted by the counter-weight 35. At the same time, the auxiliary roller 61 drops inwardly as the bell crank lever is pulled upwardly by the rod 68 secured to the bracket 71. The metal rim, covered with hard rubber, may then be removed for further processing.

From the foregoing description it will be seen that an efficient machine is provided for stitching hard rubber base bands to tires. It will be apparent that a machine of this nature may be used for other operations than that described. With slight modifications in construction, the machine may be employed to stitch soft rubber treads to rims. While a specific embodiment of the invention has been described in detail, it is not intended that the invention should be limited thereto. Only such limitations should be imposed as are set forth in the following claims.

What I claim is:

1. A machine for applying bands to circular annuli comprising a frame, a plurality of rollers fixed with respect to the frame and operative by means associated with the frame, an upwardly projecting portion on the frame, a roller carrying yoke pivotally mounted adjacent the upwardly projecting portion, a plunger operative by hydraulic pressure mounted in the upwardly projecting portion to thrust the yoke against the fixed rollers, and a counter-weight on the yoke to move the yoke from the rollers upon release of the plunger.

2. A tire building machine comprising a frame having an upwardly projecting portion, movable means mounted on the upwardly projecting portion, a roller pivotally mounted on the frame, and means extending from the movable means to move the roller upon movement of the movable means.

3. A tire building machine comprising a frame provided with an outwardly extending bracket and an upwardly projecting portion, a piston receiving portion projecting outwardly from the upwardly projecting portion and overhanging the outwardly extending bracket, rim supporting rollers mounted between the outwardly extending bracket and the upwardly extending portion, a yoke pivotally mounted on the upwardly extending portion, a roller mounted in the yoke, pressure means disposed in the overhanging portion to force the yoke toward the rim supporting roller and means to rotate the supporting rollers.

4. A tire building machine comprising a frame having rim supporting rollers mounted therein, a movable pressure roller adapted to hold a rim in position, means for exerting pressure upon the roller, and means to regulate the pressure means to compress material of variable thickness disposed on the rim to a uniform thickness.

5. A tire building machine comprising a frame having rim supporting rollers mounted therein, a pressure roller pivotally mounted above the supporting rollers, means to force the pressure roller against the supporting rollers, and means to control the forcing means to cause the pressure roller to seat under an initially low pressure and to operate under relatively high pressure.

6. A tire building machine comprising a frame having rim supporting rollers mounted therein, a pressure roller pivotally mounted for contact with the outer portion of a rim, an auxiliary rim supporting roller pivotally mounted on the frame, and link mechanism operative upon movement of the pressure roller to move the auxiliary roller.

In witness whereof, I have hereunto signed my name.

JORGEN I. HAASE.